United States Patent [19]

Reale

[11] 4,178,420

[45] Dec. 11, 1979

[54] AMINE ANTIOXIDANTS AS ANTISCORCH AGENTS IN FLAME RETARDED POLYURETHANE FOAMS

[75] Inventor: Michael J. Reale, Brewster, N.Y.

[73] Assignee: Stauffer Chemical Company, Westport, Conn.

[21] Appl. No.: 926,678

[22] Filed: Jul. 21, 1978

[51] Int. Cl.$^2$ ................................................ C08K 5/52
[52] U.S. Cl. ................................. 521/107; 521/128; 252/8.1
[58] Field of Search ............... 260/45.9 QB; 521/128, 521/107, 129; 252/8.1

[56] References Cited

U.S. PATENT DOCUMENTS

| | | | |
|---|---|---|---|
| T968,002 | 3/1978 | Baxter et al. | 521/129 |
| 2,915,496 | 12/1959 | Swart et al. | 521/107 |
| 3,497,457 | 2/1970 | Hurlock et al. | 521/107 |
| 3,846,351 | 11/1974 | Huffaker et al. | 521/128 |
| 3,896,187 | 7/1975 | Weil | 521/107 |

*Primary Examiner*—V. P. Hoke
*Attorney, Agent, or Firm*—William R. Robinson; William C. Gerstenzang

[57] ABSTRACT

The discoloration of low density polyurethane foams produced with certain flame retardants is reduced by incorporating certain amine antioxidants into the foam. The amine antioxidants can be employed by admixing with the flame retardant from about 0.25 to about 5.0 percent of the amine antioxidant by weight of the flame retardant.

12 Claims, No Drawings

4,178,420

AMINE ANTIOXIDANTS AS ANTISCORCH AGENTS IN FLAME RETARDED POLYURETHANE FOAMS

BACKGROUND OF THE INVENTION

1. Field of the Invention

The present invention generally relates to flame retarded polyurethane foams, and particularly concerns flame retarded, low density polyurethane foams having improved color characteristics.

2. The Prior Art

When low density polyurethane foams are treated with flame retardants to reduce their flammability, certain physical properties of the foams are detrimentally affected. One of the frequent problems is scorching of the center of the foam buns which results in unacceptable color of the foam. This discoloration is reduced to an acceptable level pursuant to the present invention by incorporating certain amine antioxidants into the foam.

It is known in the prior art to utilize amine antioxidants to stabilize polyurethane foams against degradation caused by light oxidation. See, for example, U.S. Pat. Nos. 3,351,608 and 3,497,457. However, the prior art has not heretofore recognized the utility of amine antioxidants to prevent cure-induced scorch of flame retardant polyurethane foams. In extreme cases, smoldering combustion can occur in the foam buns. Such problems cause loss and destruction of saleable material.

The present invention is directed to foams that do not become unacceptably scorched in the absence of a flame retardant. When the flame retardant is added to the foam formulation, however, unacceptable scorch results. It is a theory of the present invention that this scorching is the result of halogen catalyzed autooxidation of the polyether moieties present in the foam formulation. The amine antioxidants of the present invention react with the halogen atoms thereby terminating the autooxidation chain reaction.

SUMMARY OF THE INVENTION

In accordance with the present invention, the color of low density urethane foams treated with flame retardants is improved by the addition of certain amine antioxidants to the foam.

Many flame retardants cause color problems in low density urethane foams. The discoloration occurs when the foam becomes scorched during cure while the bun is standing with a high internal temperature. This generally occurs during the first 24 hours after the foam is prepared. This scorching is believed to be caused by autooxidation of the polyether moieties present in the foam formulation. This scorching mechanism is especially likely in the cases where the foam does not scorch on curing in the absence of a flame retardant. By providing amine antioxidants in accordance with the present invention these scorch problems are overcome.

DETAILED DESCRIPTION OF THE INVENTION

The present invention is particularly concerned with low density polyurethane foams that do not become unacceptably scorched when cured in the absence of a flame retardant.

The present invention is also particularly concerned with poly(haloethyl-ethyleneoxy) phosphoric acid esters used as flame retardants in low density polyurethane foams. Such flame retardants are described, for example, in U.S. Pat. No. 3,896,187.

Flame retardant compositions comprised of mixtures of poly (haloethyl-ethyleneoxy)phosphoric acid esters and other flame retardants are also included in the scope of the present invention. Said other flame retardants include tris(haloalkyl) phosphates such as tris(dibromopropyl)phosphate, tris(dichloropropyl)phosphate, tris ($\beta$-chloroethyl) phosphate and tris ($\beta$-chloropropyl) phosphate among others.

The flame retardants are employed in a flame retardant effective amount, generally from about 3 percent to about 20 percent by weight of the polyol in the foam formulation.

The antioxidant utilized in accordance with the present invention can be admixed with the foam formulation by conventional techniques. For example, it can be added alone or in combination with other ingredients of the foam formulation. It can also be admixed with the flame retardant composition prior to admixture of the flame retardant with the foam formulation.

The amine antioxidants employed in the foams of the present invention are generally provided in amounts from about 0.25 percent to about 5.0 percent by weight of the flame retardant composition. Accordingly, a flame retardant composition incorporating the antioxidant therein can be conveniently prepared prior to incorporation into the foam formulation.

Amine antioxidants that can be used pursuant to the present invention include N-(octylphenyl)-$\alpha$-naphthylamine; N,N'-bis(1-methylheptyl)-p-phenylenediamine; N-isopropyl-N'-phenyl-p-phenylenediamine; 4,4'-dioctyl-diphenylamine; diphenylamine-acetone reaction product; N-phenyl-$\alpha$-naphthylamine; N,N'-bis(5-methylheptyl)-p-phenylene diamine; N,N'-diphenyl-p-phenylene diamine; N,N'-bis(1,5 dimethylpentyl)-p-phenylene diamine; and N-phenyl-$\alpha$-naphthylamine-acetone reaction product.

Numerous conventional foam formulations for low density polyurethane foams can be utilized in accordance with the present invention. The selection of ingredients and process conditions can easily be determined by those skilled in the art.

The color of the foams of the present invention can be evaluated by numerous recognized methods as set forth; for example, in *Principles of Color Technology*, Fred W. Billinger, Jr. and Max Saltzman (Wiley Interscience, 1966).

In the experimental work on the present invention, a Hunter colorimeter was utilized to measure color difference pursuant to the color-difference formula:

$$\Delta E \text{ (Hunter)} = (\Delta L^2 + \Delta a^2 + \Delta b^2)^{\frac{1}{2}}$$

Where:
$\Delta E$ (Hunter=color difference
$\Delta L$=lightness compared to standard
$\Delta a$=redness, if positive, or greeness, if negative, compared to a standard
$\Delta b$=yellowness, if positive, or blueness, if negative, compared to a standard
All of the values for $\Delta L$, $\Delta a$ and $\Delta b$ are calculated within the Hunter instrument by electrical means and read directly from its dials. The most commonly used standard of color comparison is a pure white sample. A white tile was used in the experimental work on the present invention.

The present invention will be more fully illustrated in the Examples which follow.

then used to measure the values for calculating color difference.

The results are set forth in Table I.

TABLE I

| FOAM NO. | ADDITIVE | WEIGHT % ADDITIVE TO FLAME RETARDANT | Δ E |
|---|---|---|---|
| 1. | — | — | 41.34 |
| 2. | N-phenyl-α-naphthylamine | 1.0 | 4.62 |
| 3. | N-phenyl-α-naphthylamine | 0.5 | 32.10 |
| 4. | N-octylphenyl-α-naphthylamine | 1.0 | 3.69 |
| 5. | N-octylphenyl-α-naphthylamine | 0.5 | 24.16 |
| 6. | N,N'-bis(1-methylheptyl)-p-phenylene diamine | 1.0 | 6.72 |
| 7. | N,N'-bis(5-methylheptyl)-p-phenylene diamine | 1.0 | 4.50 |
| 8. | N,N'-bis(5-methylheptyl)-p-phenylene diamine | 0.5 | 11.36 |
| 9. | N,N'-bis(1,5-dimethylphentyl)-p-phenylene diamine | 0.5 | 22.61 |
| 10. | N-isopropyl-N'-phenyl-p-phenylene diamine | 0.5 | 28.67 |
| 11. | 4,4'-dioctyldiphenylamine | 0.5 | 27.65 |
| 12. | N-phenyl-α-naphthylamine-acetone reaction product | 0.5 | 27.46 |
| 13. | N,N'-diphenyl-p-phenylenediamine | 1.0 | 11.36 |
| 14. | diphenylamine-acetone reaction product | 1.0 | 24.35 |
| 15. | 2,6-di-t-butyl-4-n-butylphenol | 1.0 | 41.41 |
| 16. | 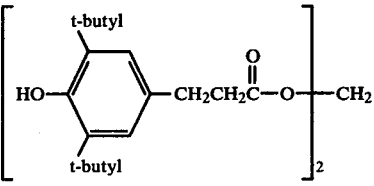 | 1.0 | 39.48 |

EXAMPLES

Several foam formulations were prepared. The basic foam formulation components for each one were as follows:

| | |
|---|---|
| 3500 Molecular weight polyether polyol | 100 grams |
| 80/20 Toluene diisocyanate (110 Index) | 61.1 grams |
| Water | 5.0 grams |
| Non-hydrolyzable silicone surfactant | 1.1 gram |
| Diazabicyclo octane catalyst (33% active) | 0.3 gram |
| N-Ethylmorpholine catalyst | 0.05 gram |
| 50% Stannous octoate | 0.4 gram |
| Flame retardant (2:1 blend of poly(chloroethyl-ethyleneoxy) phosphoric acid ester: tris (dichloropropyl phosphate) | 8.0 grams |

One of the foam formulations was admixed with a flame retardant and cured. The remaining foam formulations were admixed with the same flame retardant and various amine antioxidants in various concentrations.

After mixing all of the foam ingredients, the materials for each foam formulation were poured into a 12"×12"×5" cake box. When the foam buns completed their rises, thermocouples were inserted into the centers of the buns. When the thermocouples recorded 150° C., they were removed from the buns. The buns were then placed into a preheated microwave oven that had been calibrated so that 350 grams of water would increase in temperature by 50° C. when heated for 4 minutes. The buns were cured in the oven for four minutes, and then removed and allowed to cure at room temperature for an additional 30 minutes.

Following the cure of the buns, a one inch thick slice was cut perpendicular to the rise from the center of each bun. A two inch square sample was then removed from the center of each slice. A Hunter colormeter was then used to measure the values for calculating color difference.

It is noteworthy in the foregoing results that the phenolic antioxidants do not give satisfactory results. This is because they lose their ability to terminate kinetic chains and become chain transfer agents at temperatures above 150° C.

Having set forth the general nature and some examples of the present invention, the scope is now particularly set forth in the appended claims.

What is claimed is:

1. A flame retardant polyurethane foam comprising a low density polyurethane foam, a flame retardant amount of a flame retardant comprised of a poly(haloethyl-ethyleneoxy)phosphoric acid ester and from about 0.25 percent to about 5.0 percent by weight of said flame retardant of an amine antioxidant.

2. The flame retardant polyurethane foam of claim 1 wherein the flame retardant is further comprised of a tris(haloalkyl) phosphate.

3. The flame retardant polyurethane foam of claim 2 wherein the weight ratio of poly(haloethyl-ethyleneoxy) phosphoric acid ester to tris(haloalkyl) phosphate is about 2 to 1.

4. The flame retardant polyurethane foam of claim 2 wherein the amount of flame retardant is from about 3 percent to about 20 percent by weight of polyol present in the foam formulation.

5. The flame retardant polyurethane foam of claim 2 wherein the poly(haloethyl-ethyleneoxy)phosphoric acid ester is poly(chloroethyl-ethyleneoxy)phosphoric acid ester and the tris(haloalkyl) phosphate is tris(dichloropropyl) phosphate.

6. The flame retardant polyurethane foam of claim 2 wherein the amine antioxidant is selected from the group consisting of N-(octylphenyl)-α-naphthylamine; N,N'-bis(1-methylheptyl)-p-phenylenediamine; N-isopropyl-N'-phenyl-p-phenylenediamine; 4,4'-dioctyldiphenylamine; diphenylamine-acetone reaction product; N-phenyl-α-naphthylamine; N,N'-bis(5-methylheptyl)-p-phenylene diamine; N,N'-bis(1,5 dimethylpentyl)-p-phenylene diamine; and N-phenyl-α-naphthylamine-acetone reaction product.

7. A composition for flame retarding low density polyurethane foams comprising a poly(haloethyl-ethyleneoxy) phosphoric acid ester and from about 0.25 percent to about 5.0 percent by weight of an amine antioxidant.

8. The composition of claim 7 further comprising a tris(haloalkyl)phosphate.

9. The composition of claim 8 wherein the weight ratio of poly(haloethyl-ethyleneoxy)phosphoric acid ester to tris(haloalkyl)phosphate is about 2 to 1.

10. The composition of claim 8 wherein the poly (haloethyl-ethyleneoxy) phosphoric acid ester is poly (chloroethyl-ethyleneoxy) phosphoric acid ester and the tris(haloalkyl) phosphate is tris (dichloropropyl) phosphate.

11. The composition of claim 8 wherein the amine antioxidant is selected from the group consisting of N-(octylphenyl)-α-naphthylamine; N,N'-bis(s-methylheptyl)-p-phenylenediamine; N-isopropyl-N'-phenyl-p-phenylenediamine; 4,4'-dioctyldiphenylamine; diphenylamine-acetone reaction product; N-phenyl-α-naphthylamine; N,N'-bis(5-methylheptyl)-p-phenylene diamine; N,N'-bis (1,5 dimethylpentyl)-p-phenylene diamine; and N-phenyl-α-naphthylamine-acetone reaction product.

12. A method of preparing a flame retardant, low density polyurethane foam comprising admixing with a foam formulation a flame retardant comprised of a poly (haloethyl-ethyleneoxy)phosphoric acid ester and a tris (haloalkyl)phosphate and further admixing from about 0.25 percent to about 5.0 percent by weight of said flame retardant of an amine antioxidant.

* * * * *

UNITED STATES PATENT AND TRADEMARK OFFICE
CERTIFICATE OF CORRECTION

PATENT NO. : 4,178,420

DATED : December 11, 1979

INVENTOR(S) : Michael J. Reale

It is certified that error appears in the above-identified patent and that said Letters Patent are hereby corrected as shown below:

Column 4 - Item 1 in Table -
    "41.34" should be -- 41.38 --.

Column 4 - Item 9 in Table -
    "(1,5-dimethylphentyl)" should be -- (1,5-dimethylphenyl) --.

Signed and Sealed this

Eighteenth Day of March 1980

[SEAL]

Attest:

SIDNEY A. DIAMOND

Attesting Officer       Commissioner of Patents and Trademarks